(12) United States Patent
Khomo

(10) Patent No.: US 7,668,375 B2
(45) Date of Patent: Feb. 23, 2010

(54) METHOD OF EMPLOYING A CHIROGRAPHIC STYLUS

(76) Inventor: Malome T. Khomo, 320 Bell Ave., La Grange, IL (US) 60525

( * ) Notice: Subject to any disclaimer, the term of this patent is extended or adjusted under 35 U.S.C. 154(b) by 789 days.

(21) Appl. No.: 10/876,314

(22) Filed: Jun. 24, 2004

(65) Prior Publication Data

US 2005/0069204 A1 Mar. 31, 2005

Related U.S. Application Data

(63) Continuation-in-part of application No. 10/840,905, filed on May 7, 2004, and a continuation-in-part of application No. 10/672,647, filed on Sep. 26, 2003, now Pat. No. 7,317,450.

(60) Provisional application No. 60/552,800, filed on Mar. 12, 2004, provisional application No. 60/542,309, filed on Feb. 6, 2004, provisional application No. 60/520,169, filed on Nov. 14, 2003.

(51) Int. Cl.
*G06K 9/00* (2006.01)
*G06F 3/033* (2006.01)

(52) U.S. Cl. ........................ 382/188; 345/179
(58) Field of Classification Search ................ 382/188; 345/179; 178/19.02
See application file for complete search history.

(56) References Cited

U.S. PATENT DOCUMENTS

| | | | |
|---|---|---|---|
| 3,868,565 A | 2/1975 | Kuipers | |
| 5,012,049 A | 4/1991 | Schier | |
| 5,308,936 A * | 5/1994 | Biggs et al. | 178/19.02 |
| 5,717,168 A | 2/1998 | DeBuisser et al. | |
| 5,973,677 A * | 10/1999 | Gibbons | 345/179 |
| 6,081,261 A | 6/2000 | Stork et al. | |
| 6,229,102 B1 * | 5/2001 | Sato et al. | 178/19.01 |
| 7,109,979 B2 * | 9/2006 | Moyne et al. | 345/179 |
| 7,292,229 B2 * | 11/2007 | Morag et al. | 345/173 |
| 2002/0145596 A1 * | 10/2002 | Vardi | 345/179 |

FOREIGN PATENT DOCUMENTS

| | | | |
|---|---|---|---|
| EP | 0762319 A | | 3/1997 |
| WO | WO 95/21436 | * | 8/1995 |
| WO | WO-01/35329 A | | 5/2001 |

* cited by examiner

*Primary Examiner*—John B Strege
(74) *Attorney, Agent, or Firm*—McAndrews, Held & Malloy, Ltd.

(57) ABSTRACT

Disclosed herein is a chirographic signal pulse-emitting source and chirographic reader system. In an embodiment according to the present invention, contact-free proximity sensors may replace mechanical sensors. Ultrasonic transducers emit position-signaling pulses from a tip of the signal pulse-emitting source. Ultrasonic sensors on a reader typeface frame receive the pulses (transmissions). Proximity may be determined from the duration of travel of a pulse. Also disclosed herein is a reader subsystem including at least two separate modules. The at least two separate modules may include a pulse transmitting unit for a hand-held part and a stationary typeface frame reader sensing and receiving unit. The method may provide multiple triangulation measurements from a sensor arrangement to sense a multi-dimensional direction of the signal pulse-emitting source. The method may also provide pulse-width resolution by averaging multiple triangulation measurements for each signal pulse.

22 Claims, 8 Drawing Sheets

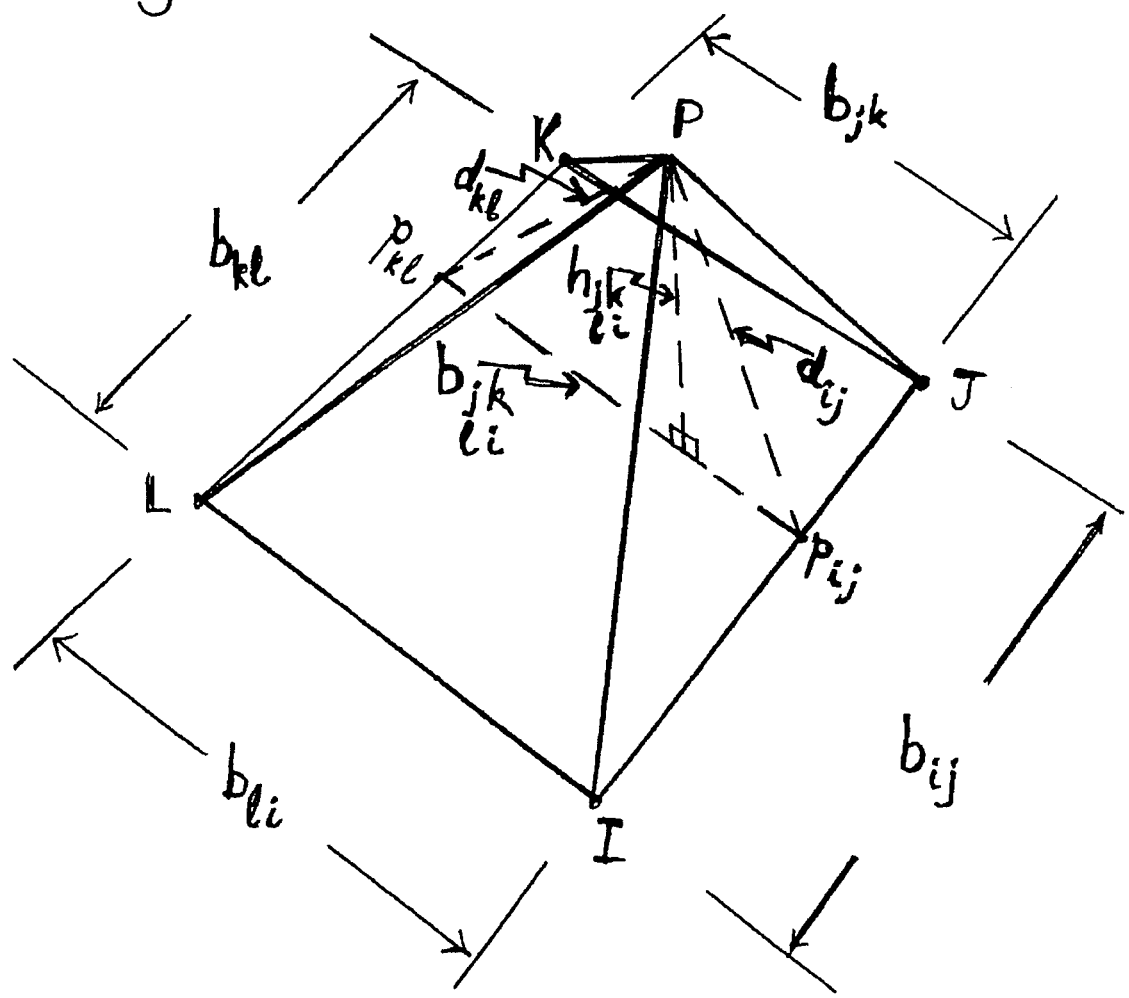

METHOD OF EMPLOYING A CHIROGRAPHIC STYLUS

CROSS-REFERENCE TO RELATED APPLICATIONS

The present application makes reference to, claims priority to and the benefit from the following Provisional Patent Applications: 60/520,169 filed on Nov. 14, 2003, 60/542,309 filed on Feb. 6, 2004, and 60/552,800 filed on Mar. 12, 2004. The complete subject matter of the above-named provisional applications is hereby incorporated herein by reference in their respective entireties.

The present application is a continuation-in-part of U.S. Non-Provisional patent application having Ser. No. 10/672,647, entitled "A Spatial; Chirographic Sign Reader", and filed on Sep. 26, 2003, now U.S. Pat. No. 7,317,450 which is hereby incorporated herein by reference, in its entirety.

The present application is also a continuation-in-part of U.S. Non-Provisional patent application having Ser. No. 10/840,905, entitled "A Spatial; Chirographic Sign Reader and System for Chirographic Reading", and filed on May 7, 2004, which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Handwriting is traditionally performed on a writing surface, such as paper, with an ink-dispensing pen or other writing instrument, such as, a pencil or paintbrush. The result is expected to be understandable by human readers.

Recently, electronic handwriting has been done on planar X-Y digitizing pads using a stylus employed to simulate handwriting upon the pad to create an electronic facsimile of handwriting. The digitizing system collects an array of X-Y coordinates of pixels corresponding to the curve tracing positional points of the stylus tip. Usually the X-Y arrays are gathered and stored as positional arrays, and are made discernible to a human reader when rendered on an X-Y display, but are rarely discernible as text by a device.

Attempts to make handwriting discernible as machine-readable text have concentrated on handwriting recognition of the X-Y traces by translation into binary coded text after affine transformation of the X-Y trace. Other techniques of recognition of the X-Y traces employ stochastic recognition based on various randomness assumptions using a statistical model. Other attempts with more deterministic techniques of recognition of the X-Y traces use velocity profiling in on-line recognition and forward search in batch recognition. Many similar X-Y trace recognition efforts have resulted in numerically intense algorithms, which tend to restrict the recognition process to off-line batch processing, conducted as a separate procedure long after the writing has been done.

More recently, on-line recognition systems have dispensed with natural handwriting and created specialized pen-stroke shorthand for letters of the Latin alphabet and Arabic numerals and punctuation marks, such as an electronic stylus recognition system. Field experience has shown that recognition error rates are high enough to cause manufacturers to begin supplanting the system with keypads and software keyboards. Miniaturized keypads are slow when compared to normal handwriting speed. Full-sized keyboards, although faster in use than miniature keyboards, are too cumbersome for optimum purposes.

Devices that track X-Y motion in true geometry exist in the form of analog joysticks. These are used as actuators for simulation and as gaming input devices, where a hand-held game controller may incorporate an analog joystick that permits tracking of directional inputs over 360 degrees around an action reference point, and is small enough to be manipulated by a fingertip. The cited range of 360 degrees signifies that the joystick spans a projection of the X-Y plane, but does not span a radial distance, i.e., the joystick is not operable to span a projection along the Z-axis. This is because the range of each joystick sensor is less than the radial range to be spanned.

The cited joystick may utilize optical quadrature sensor wheels over two orthogonal axes of rotation. Such a configuration may suffice for directional control over a planar range, but is inadequate for the capture of natural handwriting strokes because the latter requires a depth sensor.

Further limitations and disadvantages of conventional and traditional approaches will become apparent to one of skill in the art through comparison of such systems with embodiments presented in the remainder of the present application with reference to the drawings.

SUMMARY OF THE INVENTION

Aspects of the present invention may be found in a spatial chirographic system. The system may comprise a stylus subsystem unit, a reader subsystem unit, and a main system unit. The stylus subsystem unit, the reader subsystem unit, and the main system unit may be adapted to cooperatively interpret handwriting character information.

In an embodiment according to the present invention, the stylus subsystem unit may comprise a stylus comprising a signal-emitting device. The signal-emitting device may be located in a tip of the stylus. The signal-emitting device emitting signals that may be evaluated to determine a position of the tip of the stylus.

In an embodiment according to the present invention, the signal-emitting device may comprise a transducer and the signals emitted by the transducer may comprise remote ultrasonic pulses.

In an embodiment according to the present invention, the stylus subsystem unit may comprise an electrical interface between the stylus and a system data bus, signal time memory locations, and a signal-conditioning module.

In an embodiment according to the present invention, the stylus may comprise an elongated handle portion and an electrical coupling affixed to the distal portion.

In an embodiment according to the present invention, the reader subsystem unit may comprise a plurality of sensing devices. The plurality of sensing devices may be adapted to receive remote signals emitted by a remote signal-emitting device through a signaling medium. The remote signals received by the sensing devices may be evaluated to determine a position of the remote signal-emitting device.

In an embodiment according to the present invention, the remote signal-emitting device may be a transducer and the signaling medium may be ambient air. The plurality of sensing devices may comprise a plurality of microphones. The remote signals may comprise ultrasonic pulses emitted by an electronic transducer. The remote signals may comprise a plurality of information encoded in the ultrasonic pulses. The ultrasonic pulses travel at a determinable characteristic speed.

In an embodiment according to the present invention, the remote signal-emitting device may be a microwave signal transmitter or a radar signal transmitter. The plurality of sensing devices may comprise a plurality of microwave antennae or radar antennae. The remote signal may comprise remote transmission of microwave electromagnetic waves or radar electromagnetic waves. The remote pulses respond to a determinable Doppler effect on continuous changes to travel distance from a remote transmitter to the particular sensors.

In an embodiment according to the present invention, the remote signal-emitting device may a laser or an infrared emitter. The plurality of sensing devices may comprise a plurality of photoelectric sensors. The remote signal may comprise an optical signal or an infrared signal, wherein signal pulses respond to a determinable Doppler effect on continuous changes to travel distance between a remote signal emitter and the signal sensors.

In an embodiment according to the present invention, the reader subsystem unit may comprise a reader typeface frame, a plurality of sensors attached to the reader typeface frame, an electrical coupling adaptor for coupling sensor wires to the main system unit, and an electrical interface from the electrical coupling adaptor to a data bus in the main system unit.

In an embodiment according to the present invention, the main system unit may comprise a controller and a plurality of memory locations for storing information.

In an embodiment according to the present invention, the controller may comprise at least one processor and the information stored in the plurality of memory locations may comprise at least one of time information and position information associated with a signal-emitting device.

Aspects of the present invention may be found in a method for spatially reading handwriting symbols. The method may comprise determining a position of a handwriting implement by receiving a remote signal emitted by the handwriting implement at a plurality of locations, evaluating remote signal information corresponding to signal reception at each of the plurality of locations, receiving a plurality of additional remote signals emitted by the handwriting implement at the plurality of locations, and evaluating remote signal information corresponding to a plurality of signal receptions at each of the plurality of locations for the plurality of additional remote signals. The method may also comprise determining a plurality of additional positions of the handwriting implement over a period of time and determining a handwriting symbol corresponding to the plurality of positions that the handwriting implement has within the period of time.

Aspects of the present invention may be found in a method for spatially reading handwriting symbols. The method may comprise determining a position of a handwriting implement by receiving a remote signal emitted by the handwriting implement at a plurality of locations, evaluating remote signal information corresponding to signal reception at each of the plurality of locations, receiving a plurality of additional remote signals emitted by the handwriting implement at the plurality of locations, and evaluating remote signal information corresponding to a plurality of signal receptions at each of the plurality of locations for the plurality of additional remote signals. The method may also comprise determining a plurality of additional positions of the handwriting implement over a period of time and determining a handwriting symbol corresponding to the plurality of positions that the handwriting implement occupies within the period of time.

In an embodiment according to the present invention, the method may further comprise disposing a plurality of sensors about a reader interface device, maintaining a time counter, conditioning a position signal pulse, and modulating a sample time into the pulse signal.

In an embodiment according to the present invention, the method may further comprise emitting a position signal pulse from a signal emitter disposed on a tip of a stylus, recording an emission time, and recording a pulse departure time.

In an embodiment according to the present invention, the method may further comprise detecting a received position signal pulse at a plurality of reader sensors, recording arrival times of signal pulses at each of the plurality of reader sensors, and demodulating a sample departure time from the signal pulse.

In an embodiment according to the present invention, the method may further comprise deriving a pulse transmission time for a plurality of signal pulse arrival times and locating a spatial position of a signal pulse-emitting source by triangulation.

In an embodiment according to the present invention, the method may further comprise deriving an instantaneous position of a stylus based upon known positions of a plurality of sensors.

In an embodiment according to the present invention, the method may further comprise storing stylus position information in interface memory locations for acquisition by system main. The stylus position information may be based upon a relationship between a stylus instantaneous position and a plurality of known positions of a plurality of sensors.

In an embodiment according to the present invention, the method may further comprise averaging a plurality of triangulated positions using known positions of a plurality of sensors.

In an embodiment according to the present invention, the method may further comprise determining an orientation of a stylus based upon known positions of a plurality of sensors.

In an embodiment according to the present invention, determining the orientation of the stylus may comprise affixing an elongated hood to a signal emitter. The hood may be adapted to focus and direct an emitted signal along a stylus axis line and attenuate the emitted signal in other directions.

In an embodiment according to the present invention, determining the orientation of the stylus may further comprise recording the signal strength of a received signal by each of a plurality of sensors.

In an embodiment according to the present invention, determining the orientation of the stylus may further comprise accounting for attenuation of signal strength arising from distance and ascribing the orientation of the stylus to an attenuation component that is attributable to factors other than distance.

Aspects of the present invention may be found in a method for spatially reading handwritten symbols. The method may comprise defining a spatial three dimensional volume, deploying a writing tip within the spatial three dimensional volume, writing a handwritten symbol with the writing tip, measuring positions of the writing tip within the volume as the handwritten symbols are being executed, measuring motions of the writing tip within the volume as the handwritten symbols are executed, and identifying two dimensional handwritten symbols from the measured three dimensional positions and motions of the writing tip.

In another embodiment of the present invention, the method comprises defining a plane corresponding to an X-Y plane, locating an origin in space proximate the plane, defining a Z-axis orthogonal to the X-Y plane, and applying a coordinate system to define all points relative to one of the origin, the X-Y plane, the Z-axis, and angular relations corresponding to a position of the writing tip.

In another embodiment of the present invention, the method comprises applying one of Cartesian coordinates, spherical coordinates, and cylindrical coordinates to the spatial three-dimensional volume.

In another embodiment of the present invention, the method comprises inserting a writing stylus into a receptacle in a bracket mounted on a boom in a handwritten symbol reader.

In another embodiment of the present invention, the method comprises a user grasping a writing stylus and performing a writing upon a writing area within a handwritten symbol reader.

In another embodiment of the present invention, the method comprises measuring changes in an electrical component over time as the writing tip is moved from position to position during writing.

In another embodiment of the present invention, the method comprises measuring changes in an electrical component over time as the writing tip moves about with respect to a fixed position in space.

In another embodiment of the present invention, the method comprises measuring one of voltage, current, resistance, inductance, and impedance in real time.

In another embodiment of the present invention, the method comprises measuring changes in an electrical component over time as the writing tip translates from position to position three-dimensionally during handwriting.

In another embodiment of the present invention, the method comprises measuring changes in an electrical component over time as the writing tip traverses a three-dimensional path of motion with respect to a fixed position in space.

In another embodiment of the present invention, the method comprises measuring electronically one of voltage, current, resistance, inductance, and impedance in real time.

In another embodiment of the present invention, the method comprises determining measurement coordinates relative to a reader fulcrum pivot in position and an associated time coordinates.

In another embodiment of the present invention, the method comprises identifying two-dimensional handwritten symbols from the measured three-dimensional positions and motions of the writing tip. Identifying further comprises aligning an X-Y plane adjacent a writing portion of a writing platform, aligning a Z-axis with a ray pointing outward perpendicularly from the writing platform, defining the origin to be away from the writing platform, and projecting the three dimensional position and motions onto a two dimensional plane.

In another embodiment of the present invention, the method comprises identifying two-dimensional handwritten symbols from the measured three-dimensional positions and motions of the writing tip. Identifying further comprising measuring motion over time along at least two orthogonal axes of rotation and along a radial distance, applying a first rotary measurement to span rotation in a projection plane over the flat surface of the platform, applying a second rotary measurement to span an angular elevation from the projection plane, and applying a third radial measurement of linear distance from a reader fulcrum pivot along the elevation.

Aspects of the present invention may be found in a device for spatially reading handwritten symbols. The device may comprise a platform having a flat surface. A spatial tracking assembly may be positioned adjacent to and may rotatably engage a planar writing area selected from the flat surface of the platform. In an embodiment according to the present invention, the spatial tracking assembly may be configured to slidably accept a writing stylus and to rotate with the stylus about an axis parallel to the flat surface. A stylus tip of the writing stylus may be adapted to trace a three dimensional path in a volume above the flat surface of the platform.

In an embodiment of the present invention, the spatial tracking assembly may comprise a boom, an assembly support pinion providing rotatable engagement with the flat surface of the platform, a fulcrum housing having a fulcrum bracket connected to the assembly support pinion, a fulcrum pinion rotatably engaging the fulcrum housing orthogonally to the assembly support pinion, and a securing means for rotatably securing the spatial tracking assembly to the flat surface of the platform. In an embodiment according to the present invention, the securing means may comprise a restricting flange on one end of the assembly support pinion, a locking feature on another end of the assembly support pinion, and a locking member mating with the locking feature to lock the assembly support pinion in the platform. The spatial tracking assembly may be adapted to rotate at least two dimensionally with respect to the flat surface of the platform.

In an embodiment according to the present invention, the boom may comprise at least one elongated boom stem attached to the fulcrum pinion at one end of the boom stem, a tracking bracket slidably attached to the boom stem, and an opening on the tracking bracket. The opening may serve as a receptacle for engaging the boom with the writing stylus. Three-dimensional movement of the stylus tip may be translated through movement of the tracking bracket along the boom stem into a two dimensional representation of a symbol. In an embodiment according to the present invention, the boom stem may comprise a plurality of boom stems.

In another embodiment of the present invention, the tracking bracket may comprise a reference tracking point fixed relative to the stylus receptacle, a reference position of the tracking bracket along the boom, and a reference position of the boom. The tracking point may lie within the writing volume and reference positions may be used to define a three-dimensional coordinate space in which the tip of the stylus may move.

In another embodiment of the present invention, the tracking point may comprise a measurement means for measuring a time component, and a measurement means for measuring a position measurement. The position measurement may comprise measurement of a linear position along the boom and measurement of an angular position. The measurement of an angular position may comprise an angular position rendered by an angular position of the fulcrum pinion, and an angular position rendered by an angular position of the assembly support pinion. Measurements may be used to determine a dynamic state variable of the stylus tip.

In another embodiment of the present invention, the position measurement may be collected as tracking data. The tracking data may comprise output of a linear position sensor of the sliding bracket along the at least one boom stem, output of an angular position sensor of the boom around the fulcrum, and output of an angular position sensor of the reader assembly around the platform housing. Tracking data may be used to determine a dynamic state variable of the stylus tip.

In another embodiment of the present invention, the tracking data may comprise a set of measurement position and time coordinate readings. Measurement coordinates may be transformed into a spatially equivalent set of Cartesian coordinates. A conversion to font-centric coordinates may comprise a conical projection of the Cartesian coordinates onto the writing area and a restriction of the conical projection. The restriction may produce an image upon the writing area that is true to an image of writing upon a traditional writing medium, and an identification of the restriction with a projection pre-image in writing volume of a true writing image. Three-dimensional writing motions formed within the writing volume may be identified and interpreted as two-dimensional handwritten symbols in real time.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is a perspective illustration of a position-location method using a redundant coplanar fourth sensor on a typeface plane to determine X, Y, and Z coordinates of a remote point P according to an embodiment of the present invention.

DETAILED DESCRIPTION OF THE INVENTION

Figure 1:
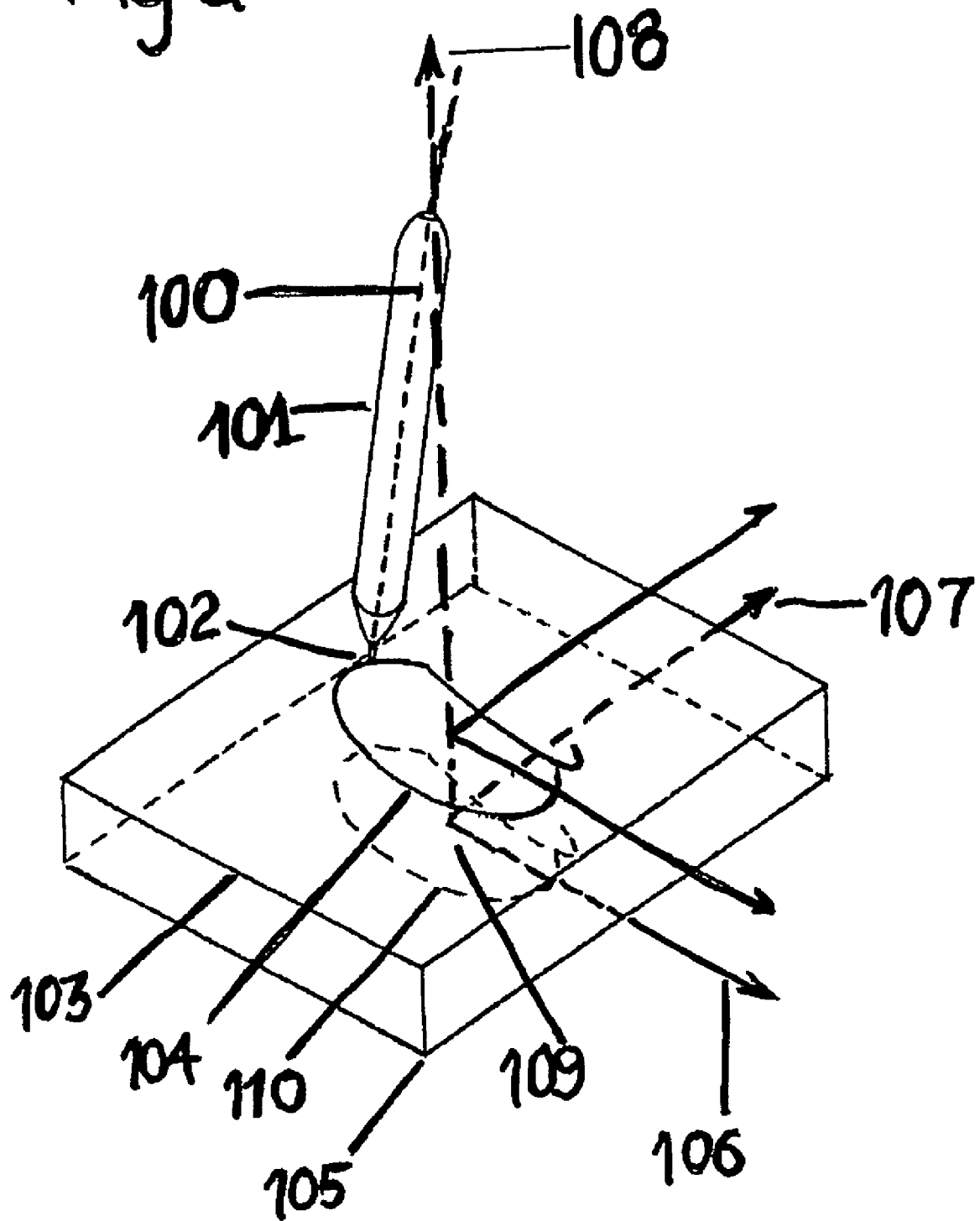
FIG. 1 illustrates a perspective view of an exemplary mechanical writing stylus illustrating writing of the small Latin letter 'a' over a writing surface within a font coordinate frame according to an embodiment of the present invention.

Aspects of the present invention may be found in a spatial chirographic system having input device drivers adapted to collect spatial chirographic data from any one of a plurality of spatial chirographic devices. The chirographic applications for which the spatial chirographic system inputs spatial data may comprise text character recognition, text setting, handwritten page scanning, sign styling, and image rendering, for example.

In an embodiment according to the present invention, a chirographic input device may be mechanically coupled to a stylus to assert handwriting. The stylus may be held independent of a chirographic reader, but may be engaged with a reader receptacle before the reader captures a writer's handwriting actions and movements. In an embodiment according to the present invention, the chirographic stylus may be mechanically attached to the chirographic reader. In an embodiment according to the present invention, the relative freedom of movement of the stylus may be tied to a particular configuration of the reader portion of the spatial chirographic device, which may mechanically restrict potential configurations under which a freely held stylus may be utilized against any of the spatial chirographic input devices.

Because freedom of movement is essential when using a stylus, a great advantage may be obtained by eliminating incidental mechanical constraints associated with operation of a chirographic device. Aspects of the present invention may be found in a chirographic system eliminating mechanical connections between a chirographic stylus and a chirographic reader for chirographic applications.

Aspects of the present invention may be found in a chirographic system wherein contact-free proximity sensors may be employed to replace mechanical sensors. In an embodiment according to the present invention, ultrasonic transducers may be adapted to emit position-signaling pulses from a tip of a chirographic stylus. In an embodiment according to the present invention, ultrasonic sensors on a chirographic reader typeface frame may be adapted to receive the pulses (transmissions). Proximity may be determined from the duration of travel of a pulse between a stylus tip and a reader sensor. A multi-dimensional location may be determined by a plurality of durations of a pulse between a stylus tip and a plurality of reader sensors.

In an embodiment according to the present invention, the chirographic stylus system may be adapted to accommodate a detached mechanical stylus. Aspects of the present invention may be found in a stylus reader subsystem comprising at least two separate modules. The at least two separate modules may include a stylus pulse transmitting unit for a hand-held part (stylus) and a stationary typeface frame reader sensing and receiving unit.

In an embodiment according to the present invention, the chirographic system may be adapted to determine a universal pulse departure time and identify a received pulse having an associated departure time. In an embodiment according to the present invention, the pulse may be modulated and the associated departure time may be carried in a positioning signal to correlate a received pulse with an associated departure time.

In an embodiment according to the present invention, the method may provide multiple triangulations from a rectangular arrangement of sensors in order to take advantage of and to better sense direction of a depth of the stylus, and to improve a pulse-width resolution by averaging multiple triangulation of each pulse. Electronically derived position data acquired remotely by a chirographic system having a mechanically un-coupled stylus device employing a remote stylus may be treated in the same manner as mechanically derived position data acquired mechanically by a chirographic system having a mechanically coupled stylus device according to an embodiment of the present invention.

The present invention relates to spatial tracking of handwriting for interpretation of handwriting motion using a plurality of three-dimensional position sensors to identify two-dimensional signs, symbols, or glyphs made by a writing stylus in real time.

The present invention may enhance an analog X-Y joystick providing the joystick with the ability to a track radial depth, i.e., along the Z axis, and capture true spatial geometry for use in capturing handwritten symbols and for use in symbol recognition in real time.

The present invention makes the foregoing objectives possible by considering an assumed X-Y typeface to be in a projection plane for a font-centric coordinate system under which symbols may be more easily discernible than in a general X-Y pixel coordinate system. The present coordinate system spans a three-dimensional volume with a font-specific origin located at a depth below the X-Y typeface plane and may be captured by employing a reading device that can additionally track the depth of pen strokes so that information can be used to identify where an intended glyph begins and ends, thereby facilitating identification of a particular glyph or symbol in real time. The addition of such invisible information may greatly improve the speed and accuracy of symbol recognition.

The present invention makes the foregoing objectives possible by providing a miniaturized electronic input device that approaches keyboard reliability and supports machine readable input at handwriting speed in freehand script. The present invention also provides an input mechanism supporting symbol encoding, wherein symbol recognition is not computationally expensive. In order to support miniaturization, the present invention provides a recording device that dispenses with the multiple electronic keys found in keyboards and keypads by replacing them with a universal reader of handwritten symbols in real time.

The present invention may provide an elongated pointing device to track a writing stylus tip by pointing toward it in planar directions from an origin suggested by a pivot point, thus providing true geometric distance measurement. The present invention may also provide for tracking radial motion of the stylus tip along a direction pointed to, (i.e., the ray), so that true Cartesian distance in the plane may be tracked.

The present invention may provide spatial tracking in a two-dimensional true geometric tracker by applying a two dimensional tracker twice. The present invention may apply the two-dimensional tracker initially to span a plane, for example, the X-Y plane. Then, by aligning the tracker's axis of rotation with the Z-axis, achieve true spatial tracking in the X-Y-Z spatial volume. The present invention may apply the same tracker a second time by configuring the axis of rotation of the second application to coincide with the ray of the first application, and aligning the two, so that the axes of rotation intersect at a point. Mounting the second two-dimensional tracker upon the first two-dimensional tracker in this fashion makes the two rotary axes orthogonal, ensuring that together they will span a three-dimensional volume.

The mounting arrangement may also make the two ray distance measurements coincident, dispensing with the need for a second radial measurement, while achieving true spatial tracking with only three measurements. To ensure that a three-dimensional volume is spanned, a restriction is made on the writing volume to the range limit imposed by each sensor. The present device may not necessarily span a 360-degree angular range, but rather may be limited to a quadrant in each angular dimension, as determined by the specific application.

The first measurement point may be the angle of rotation of the device within the X-Y plane, which may be measured as a polar coordinate angle theta ($\theta$) relative to the X-axis as ray origin and captured directly by rotational quadrature readings in the X-Y plane. A second reading from the device may be made from another quadrature device for capturing rotations that are orthogonal to the X-Y plane of rotation, and may be spherical coordinate angle phi ($\phi$), and may be defined to coincide with a Z-axis latitude angle of inclination with X-Y equatorial plane as ray origin. A third reading may be of the radial distance rho ($\rho$), and may be captured by a linear quadrature along the length of the pointing device ray, with the compound pivot-point as origin.

The captured data points of the compound spatial joystick may form spherical coordinates, and a transformation of the measurement coordinates to Cartesian font coordinates may be provided to facilitate device use as a chirographic symbol reader. Alternatively, cylindrical coordinates may also be applied to designated points in a given spatial three-dimensional volume.

In the following detailed descriptions of the drawing figures, spatially orienting terms are used, such as "left", "right", "vertical", "horizontal", "upper", "lower", etc. It is to be understood that these terms are used for convenience of description of the preferred embodiments by reference to the drawings. These terms do not necessarily describe the absolute location or orientation in space, such as left, right, upward, downward, etc., that any part may assume.

Additionally, in the following detailed description, dynamic state variables are described. Dynamic state variables may comprise at least velocity and acceleration, and further may comprise linear, angular and radial dynamic states, for example, position as a function of time and motion as a function of time in any desired coordinate reference frame.

FIG. 1 illustrates a top perspective view of a writing instrument 101, in contact with a writing surface 103, and positioned along an imaginary line 100 above the writing surface 103. In FIG. 1, the writing instrument 101 may comprise a stylus elongate member with a writing tip 102 at the lower extremity of the stylus. The writing surface 103 is illustrated suitably magnified in FIG. 1 to emphasize depth above and below the actual writing 104, which is illustrated here with the sample lettering of the Latin cursive small letter 'a', for example, but may be any handwritten symbol. The writing 104 may be contained within a handwriting font face, which may be defined to be the rectangular frame 105, containing an image 110, of the writing 104, projected below the surface 103.

The typeface frame 105 may also define a Cartesian X-Y coordinate system, for example, with Y-axis 106, and X-axis 107 at the center, together with a projection from an origin below the projection plane, forming the font coordinates. The writing surface 103 in FIG. 1 is illustrated in the horizontal X-Y plane and the depth of the writing tip 102 above and below the writing surface 103 may be measured in a direction along the Z-axis 108. The origin of the illustrated font coordinate system is shown in FIG. 1 located at point 109, at the intersection of the three axes 106,107 and 108, below the writing surface 103. The font face 105 is depicted in more detail in FIG. 2 below.

Figure 2:
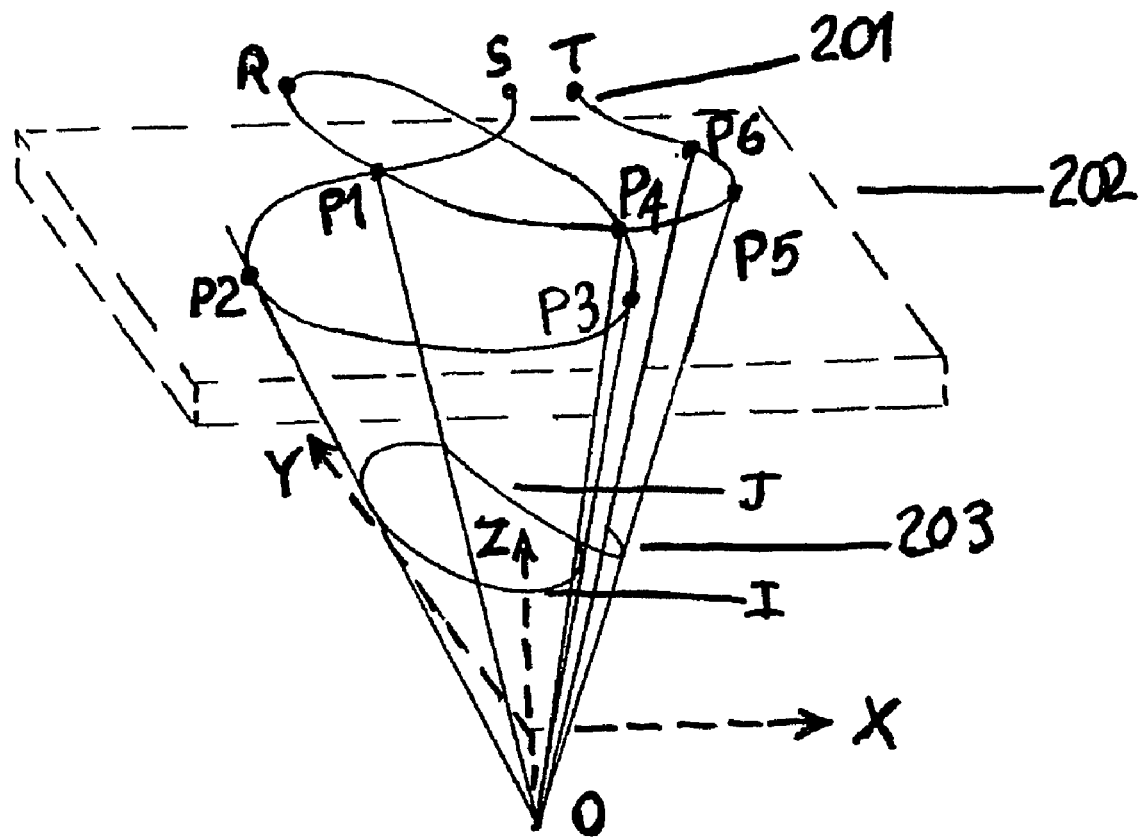
FIG. 2 illustrates an exploded view of a font face illustrating projection of a stylus trace of the small Latin letter 'a' upon an X-Y plane according to an embodiment of the present invention.

FIG. 2 illustrates an exploded view of the font face 202. FIG. 2 introduces many invisible coordinate reference elements (points and lines) that are labeled alphabetically below, leaving the labeling of the other elements numerical. FIG. 2 illustrates at the top of the diagram a writing path 201 of the writing instrument tip over the font face 202.

In an embodiment according to the present invention, the writing path 201 may begin at starting point S, and sequentially traverses the points on the path marked with dots and labeled P1, P2, P3, P4, R, P5, P6, and T. Points R, S, and T of the path may lie above the font face 202, whereas points P1 to P6 inclusive may lie within the font face 202.

The writing path 201 is illustrated projected conically, in FIG. 2, for example, onto projected image 203 of the sample Latin letter 'a' in a horizontal plane. The projection is not limited to being conical and alternatively may be cylindrical, spherical, or may have some of other shape. By convention, the projection plane lies at the bottom of the font face 202. The image's coordinate axes are on two invisible lines marked in FIG. 2 by dashed lines with arrowheads labeled X and Y, respectively. The projection is illustrated in the X-Y reference plane, by convention, and marks the bottom of the font face 202.

In order to support the projection described herein, the origin O of the font-centric coordinates may be placed at a unit standard depth below the writing surface to act as the projection apex. The origin O lies below the font face 202, by convention. The ray projecting from origin O to the center of the X-Y frame follows the Z-axis, which is a line illustrated in FIG. 2 by the dashed line with arrowhead labeled Z.

The projected image 203 appears in FIG. 2 as two continuous arcs, I and J, corresponding to paths P1-P2-P3-P4 and P1-P4-P5-P6, respectively, wherein the arcs cross each other at intersection points P1 and P4. An invisible straight line drawn connecting path points P1 and P4 may lie in the plane of the font face 202.

Figure 3:
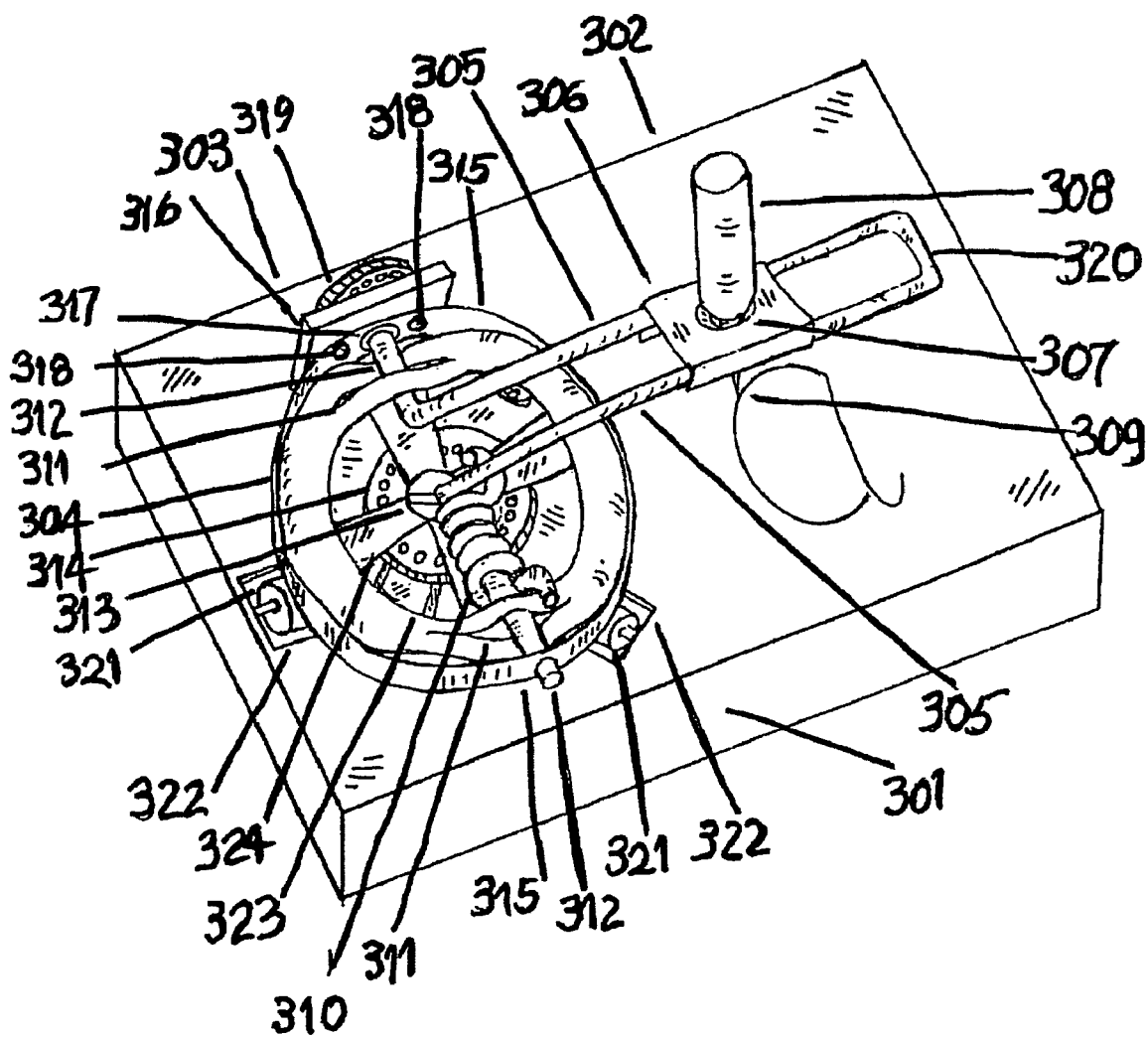
FIG. 3 illustrates a top perspective view of an exemplary mechanical chirographic reader illustrating the writing of the small Latin letter 'a' according to an embodiment of the present invention.

FIG. 3 is a perspective view of the chirographic reader illustrating the writing of small Latin letter 'a', for example, in a writing area 302 of the base platform 301. In an embodiment of the present invention, the writing area 302 may be offset from the fulcrum support area 303 of the base platform 301. The fulcrum support platform, which may rest in the generally horizontal direction, may have a vertical opening (not visible in FIG. 3) receiving the vertical major pinion 313 of the fulcrum so that the fulcrum can swivel around horizontally. The bottom of the major pinion 313 may accommodate a locking pin in a groove around the pinion circumference to lock the fulcrum to the support base after the vertical pinion has been inserted fully into the supporting platform base.

A quadrature wheel 314 may be firmly attached at the top of the vertical pinion 313. The support platform may have a quadrature sensor 323 mounted flush with the platform surface, as illustrated in FIG. 3 partly obscured by the quadrature wheel, when the major pinion 313 is fully inserted in the platform housing. The major pinion 313 may be locked in place with a locking pin to position the quadrature wheel 314 close to the sensor 323. This is illustrated separately below in FIG. 4.

In an embodiment according to the present invention, four extensions 324 of the fulcrum bracket (only the one in the foreground of FIG. 3 is marked) may bend down and inward into the housing for the major pinion 313. The extensions may be adapted to fit into the housing like a sleeve between the housing body and the major pinion 313.

A boom 320 may extend the reach of the reader from the fulcrum into the writing area 302 by elongated stems 305. The support area 302 may accommodate a circular fulcrum bracket 304 having openings 311, for supporting minor pinions 312 of the reader boom stems 305. Firmly attached to the fulcrum bracket 304 may be a support collar 315 for quadrature sensor 316. The collar 315 may also rest on three horizontal stabilization rollers 321, two of which are shown in the foreground of FIG. 3. The rollers 321 may be rotatably attached to the fulcrum support base in roller housing wells 322.

The boom 320 may extend over the base platform along a linear offset from the support area into the writing area 302. The free end of the boom 320 may accommodate a bracket 306 that mates with boom stem 305 to allow the bracket 306 to slide along the boom stem 305. The bracket 306 may have a hollow receptacle 307 at the center, into which writing tip 309 of stylus 308 may be lodged to engage the chirographic reader. The stylus 308 may engage the reader by insertion of stylus tip 309 through the top side of the receptacle towards writing surface 302, as shown in FIG. 3.

Sliding the receptacle along the boom stems 305 may accommodate motion of the stylus tip in the boom's radial direction. In an embodiment of the present invention, the position of the receptacle along the boom 320 may be derived electrically or electronically, to avoid angular inertia associated with the quadrature wheels, in real time. The position as a function of time is a measurable dynamic state variable, for example, velocity, which may be calculated. Additionally, further dynamic state variables may be calculated, such as, for example, acceleration, i.e., velocity as a function of time, etc. The dynamic state variables may be calculated, manipulated, and/or described in any desired coordinate system or frame of reference.

In an embodiment of the present invention, the boom stem 305 may be made of a resistive material and the bracket 306 may be made of a conductive material so that sliding contact between the bracket 306 and the boom stem 305 may create an electrical shunt to alter an overall electrical resistance according to the bracket position along the boom 320 at a particular moment in time. The resistance may be measured at the pinion 312 sections of the boom 320. A sensor current may be applied across pinions 312 to enable measurement of the radial motion rho ($\rho$) along the boom 320. The contact point 311 may be fitted with an adhesive one-sided strip conductor that leads via bracket extensions 324 to the underside of the platform 301. The underside of the platform may house batteries to power the circuit. The electrical circuitry and batteries are not shown in the FIG. 3.

Although resistance measurement has been disclosed by way of example, the present invention is not limited to resistance measurement but also contemplates measuring changes in an electrical component by measuring one of voltage, current, resistance, inductance, impedance, etc. in real time or alternatively electronically, via solid state microchip measurement embodiments.

The boom 320 may be loaded with a spring 310 to enable the boom 320 to rest in the raised position when the stylus is retracted. One end of the spring may lock onto one of the boom stems 305 and apply spring torque to keep the unloaded boom raised. One end of the spring may coil around one of the minor pinions 312 of the boom 320. Another end of the spring may anchor the boom against the fulcrum bracket 304.

Another minor pinion 312 may extend through fulcrum bracket opening 311, opening 317 of support collar 315, and finally through an opening (not shown) in quadrature sensor 316, where the pinion end may be firmly attached to quadrature wheel 319. The pinion 312 may rotate freely through the openings and the quadrature wheel 319 may also rotate in close proximity to quadrature sensor 316 to effect rotary readings about the minor pinion 312 measured angle phi ($\phi$) in real time. Electrical circuitry associated with the quadrature sensors is not shown in FIG. 3.

Figure 4:
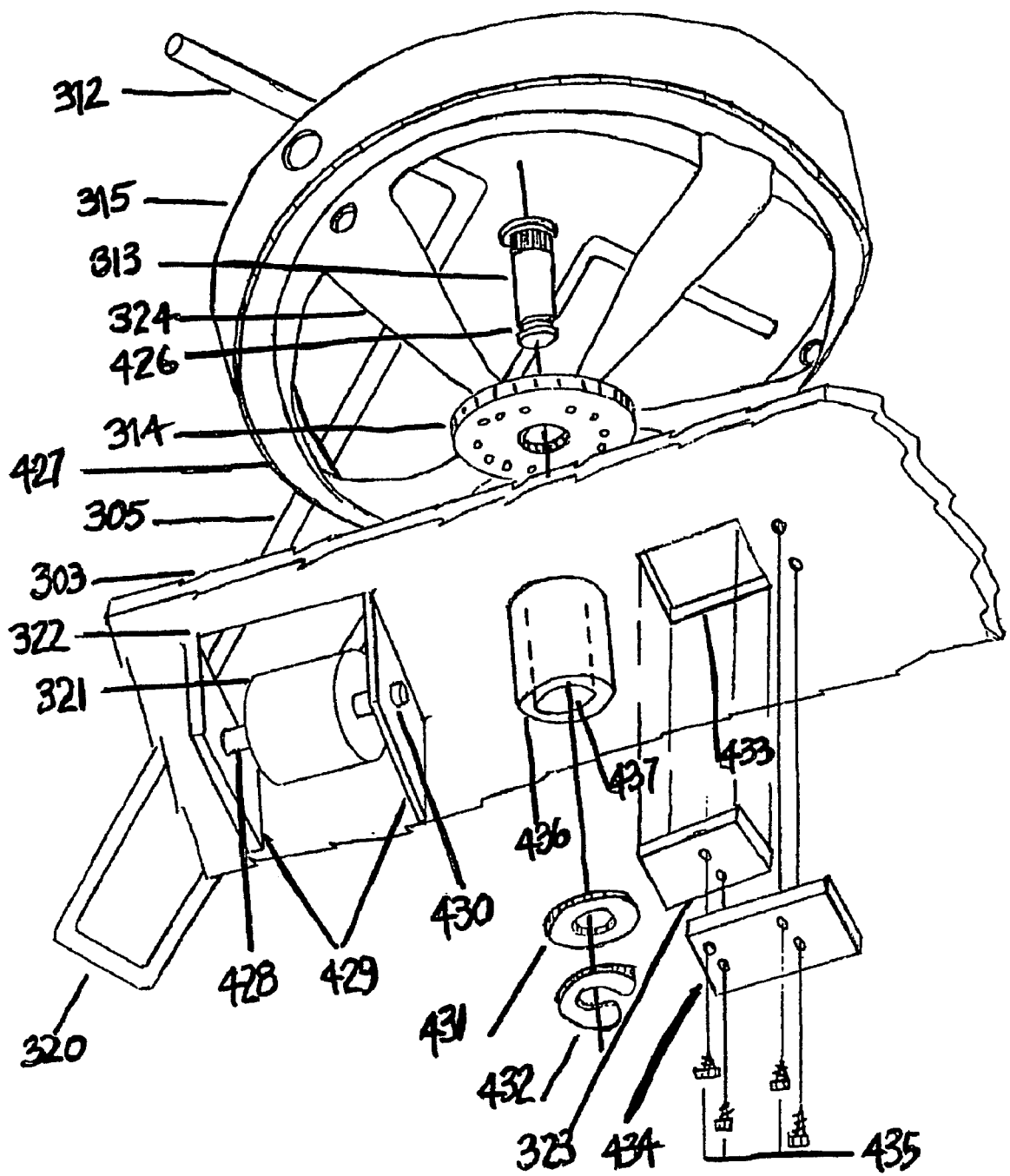
FIG. 4 illustrates a bottom exploded view of exemplary fulcrum undercarriage features obscured in FIG. 3 according to an embodiment of the present invention.

FIG. 4 illustrates a bottom perspective view of the fulcrum undercarriage exposing features that were obscured in the top perspective view of FIG. 3. In FIG. 4, the element numbering system of FIGS. 3 and 4 are commingled to promote unique part identification. For example, platform member 303, also shown in FIG. 3, is shown here with identical designation 303, (instead of 403), and is largely cut away to expose the upper carriage elements identified in FIG. 3. Therefore, features appearing in FIG. 4 that have already been identified in FIG. 3 are designated with the same numerical label as was used in FIG. 3, and features that are revealed for the first time in FIG. 4 are designated by new numerical labels distinct from those already assigned in FIG. 3. Newly discussed items therefore begin at numeral 426, assigned to groove 426, disposed at the lower end of the major pinion 313.

The underside of support collar 315 exposes the running surface 427, which makes contact with roller wheel 321, when fully assembled. The roller wheel 321 floats in the housing well 322 and may be rotatably attached with axle 428 through opening 430 on opposing flanges 429.

The pinion 313 may fit through opening 437 and may be kept true to the vertical axis by guide 436. The pinion 313 may be inserted through the friction-abating washer 431 and be locked in place with pin 432. An opening 433 in the support platform 303 may accommodate quadrature sensor 323. The quadrature sensor 323 may be firmly attached to the platform 303 with the use of supporting flange 434 and screwed onto the platform 303 with screws 435. Once firmly attached, the reading side of the sensor 323 may be in close proximity to quadrature wheel 314 enabling the measurement of the angle of swivel theta ($\theta$).

FONT COORDINATE SYSTEM OF AN EMBODIMENT OF THE PRESENT INVENTION

A font coordinate system may be a Cartesian system, for example, which may be configured so that the X-Y plane coincides with the writing portion of the support platform, and the Z-axis coincides with the projective ray pointing outwards at the middle of the font face, and with the origin O below the writing surface. While the origin O has been shown defined below the writing surface the origin O may also be above or aligned with the writing surface in other embodiments.

The measurement coordinates, when relative to the reader fulcrum pivot, may coincide with spherical coordinates such that the measured angle phi ($\phi$) may correspond to the angle of latitude, measured angle theta ($\theta$) may correspond to a polar coordinate relative to the X-axis, and measured angle rho ($\rho$) may correspond to a radial translation as follows:

$$x_m = \rho \cos(\phi)\cos(\theta);$$

$$y_m = \rho \cos(\phi)\sin(\theta); \text{ and}$$

$$z_m = \rho \sin(\phi).$$

The font coordinates may also be derived from the measurement coordinates as follows.

A reader having a base platform of unit thickness (in the Z-direction), width 4w (in the X-direction), and the font face being a square of side 2w. The distance between the reader fulcrum Z-axis and the font face Z-axis may be 2w.

$$x = x_m - 2w$$

The font origin may be at unit distance below the platform surface.

$$z = z_m - 1$$

The font face and measurement coordinates share coincident X-axes.

$$y = y_m$$

The reader receptacle may have the following range: The minimal range over the writing surface the radial distance may be 2w. The maximal distance over the writing surface may be the hypotenuse ($\sqrt{10}$)w.

Aspects of the present invention may be found in elimination of the mechanical attachment of the chirographic stylus from the chirographic reader. Elimination of the mechanical attachment may be achieved by introducing remote position sensing between the chirographic stylus and the chirographic reader. The chirographic stylus may be adapted to transmit a signal. The chirographic reader may be adapted to receive the signal transmitted by the chirographic stylus. The chirographic system may be adapted to calculate the relative position of the chirographic stylus with respect to the chirographic reader.

The above descriptions of the spatial chirographic system, in accordance with an embodiment of the present invention, focused on operational features of a mechanically attached reader and stylus, such as that illustrated in FIG. 3, for example.

In an embodiment according to the present invention, a mechanically detached stylus is disclosed. The mechanically detached stylus may be used by an infant, under guidance of a parent or teacher, to facilitate learning handwriting without the distraction of learning how to properly affect mechanical coupling of the mechanical reader device illustrated, for example, in FIG. 3.

Aspects of the present invention may be found in extending the range of potential chirographic applications to include a handwriting learning process. In an embodiment according to the present invention, visual subject matter templates (handwriting characters) may be used to facilitate interaction between a learner and a teacher. In an embodiment according to the present invention, interactive handwriting instruction may comprise communication via spatial symbols, chirographic signs, and/or a spatial assertion of characters from at least one of a plurality of languages.

The chirographic system, according to an embodiment of the present invention, is amenable to wireless operation. In another embodiment according to the present invention, a user may employ a stylus and a reader that are wired to a chirographic system, however, the stylus and reader communicate wirelessly with each other. Aspects of the present invention may be found in a wireless embodiment of stylus unit, and/or a reader unit without departing from the essence of the present invention.

Likewise, the chirographic system according to the present invention may be adapted for use in networked chirographic applications. Interactive applications may comprise a plurality of distributed chirographic applications, for example.

Figure 5:
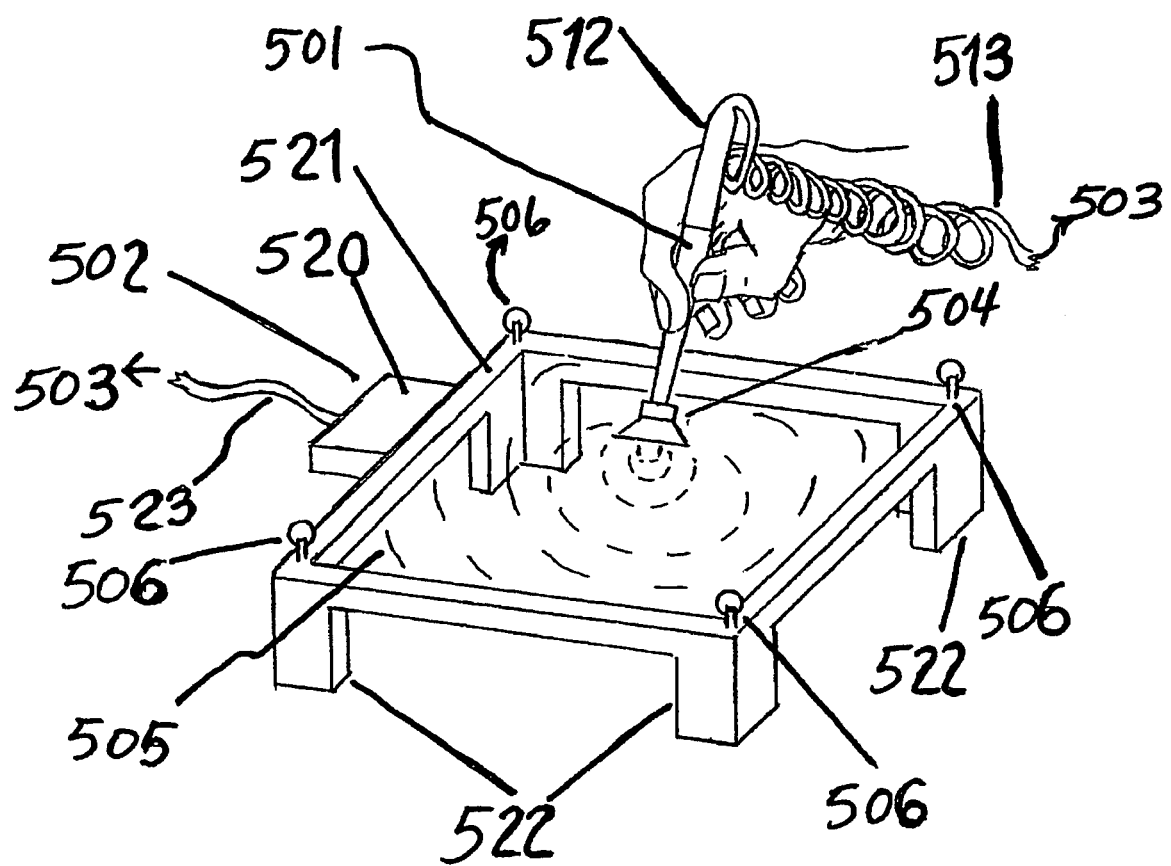
FIG. 5 illustrates an exemplary embodiment of the present invention employing ultrasonic signaling between an exemplary electronic chirographic stylus and an exemplary electronic chirographic reader typeface frame according to an embodiment of the present invention.

FIG. 5 illustrates a chirographic stylus 501 featuring a main holder stem that may be manually deployed above a chirographic reader 502 according to an embodiment of the present invention. In an embodiment according to the present invention, the chirographic stylus 501 and the chirographic reader 502 may be mechanically unattached from each other.

In an embodiment according to the present invention, the stylus 501 may comprise a transducer 504 located at a tip of stylus 501 and a connector portion 512 for connecting wiring 513. In an embodiment according to the present invention, the connector portion 512 may comprise a transmitter for wireless communication. In another embodiment according to the present invention, the connector portion 512 may comprise a battery. The connector portion 512 may be removable from the stylus 501 in accordance with another embodiment of the present invention.

In an embodiment according to the present invention, wiring 513 may be adapted to connect the stylus 501 to a system unit (not shown in FIG. 5) at an end 503 of wiring 513. In an embodiment according to the present invention, the stylus 501 may be adapted to communicate wirelessly with the system unit via a transmitter resident in the connector portion 512 of the stylus 501.

The chirographic reader 502 may comprise a typeface frame 521 supported by frame supports 522 located along an underside of each corner of typeface frame 521. The frame supports 522 permit a writing plane of the reader 502 to be raised above a surface upon which the reader 502 may be located when in use. The reader 502 is illustrated being generally square or rectangular in FIG. 5, however the reader 502 may be circular, triangular, or many-sided in accordance with an embodiment of the present invention.

A plurality of ultrasonic microphones 506 may be disposed along a top of the typeface frame 521. In FIG. 5, the microphones 506 are illustrated disposed at corners of the typeface frame 521, however, the microphones 506 may be disposed anywhere along the typeface frame 521 in accordance with an embodiment of the present invention. Additionally, in FIG. 5, four microphones 506 are illustrated, however, at least two microphones may be employed in accordance with an embodiment of the present invention.

The chirographic system may be provided with a reader adaptor 520. The reader adaptor 520 may be connected to the microphones 506 via a wire or wirelessly. The reader adaptor 520 may also be connected to the system unit (not shown in FIG. 5) at an end 503 of wiring line 523. In an embodiment according to the present invention, the reader adaptor 520 may be adapted to communicate wirelessly with the system unit (not shown in FIG. 5).

The stylus 501 may comprise at least one transducer 504 disposed at an end of the stylus 501. The transducer 504 emits ultrasonic pulses that may be received by microphones 506. The ultrasonic pulses, emitted by the transducer 504, travel wirelessly through the ambient medium (the air) in wave fronts 505. The wave fronts 505 arrive at each of the microphones 506 at a time that is dependent upon the distance the transducer 504 (i.e., the stylus 501 tip) is from each microphone 506 at any particular instant. A particular location of the transducer 504 per unit time with respect to each of the microphones 506 (and thus the position in space of the transducer 504) may be precisely determined based upon an analysis of the travel times of the ultrasonic pulses received at each microphone 506. Although four microphones 506 are illustrated in FIG. 5, the present invention is not limited to four microphones 506. The number of microphones 506 may be fewer or more than four depending upon the application, the typeface frame configuration, etc., in accordance with an embodiment of the present invention.

Figure 6:
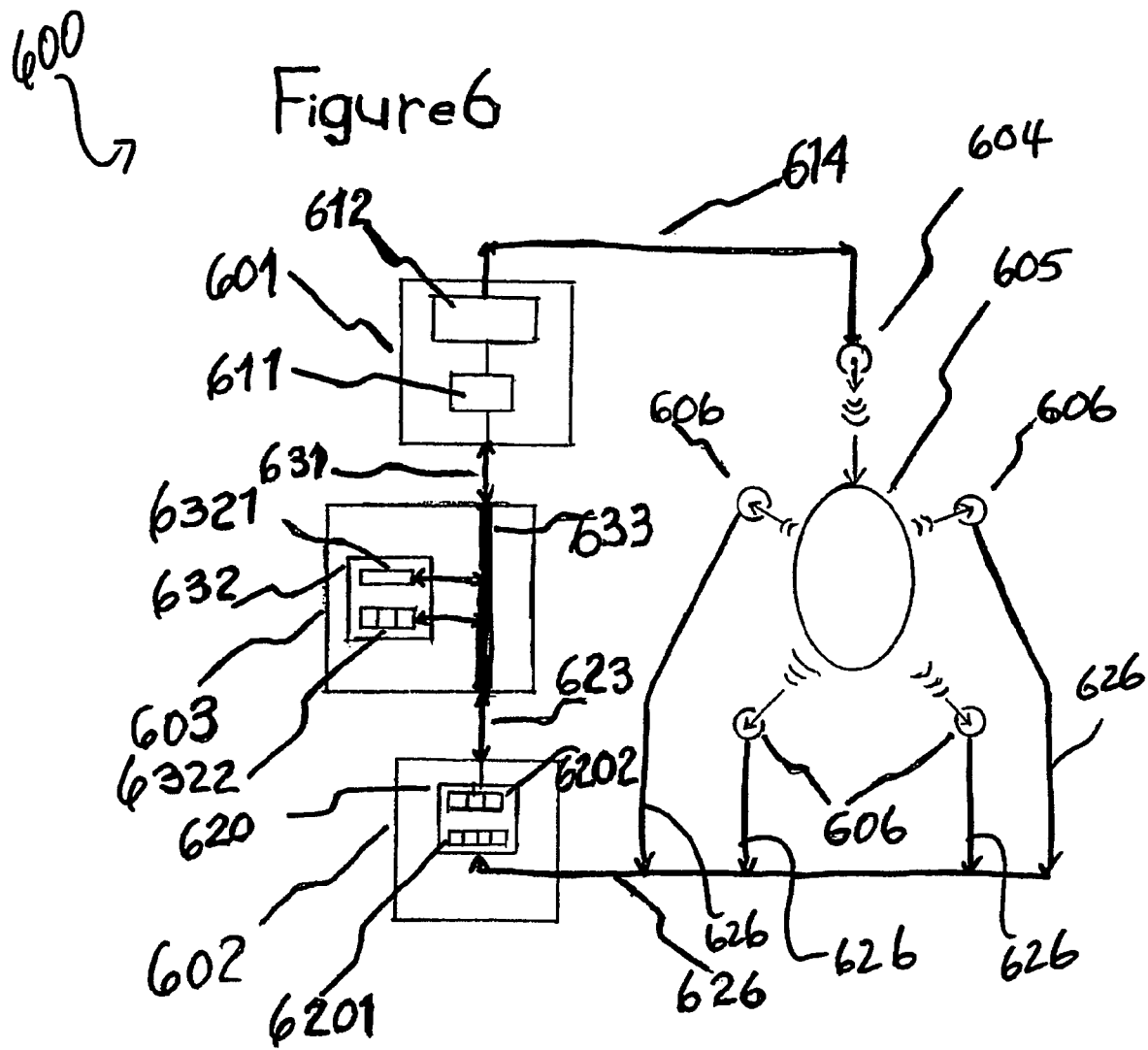
FIG. 6 illustrates an exemplary electronic chirographic system via a plurality of schematic block diagrams illustrating a central system unit connected to an exemplary electronic stylus-position signaling output device and an exemplary electronic position signal reader according to an embodiment of the present invention.

FIG. 6 is a schematic drawing illustrating an exemplary spatial chirographic system 600 according to an embodiment of the present invention. The chirographic system 600 may comprise a stylus subsystem unit 601, an ultrasonic reader subsystem unit 602, and a main system unit 603.

In an embodiment according to the present invention, the stylus subsystem unit 601 may also comprise a stylus position-signaling adaptor 611 attached to the main system unit 603 via a connector, for example, connector 631. The stylus position-signaling adaptor 611 may be adapted to transmit a position signal from/to transducer 604 via a wire connection, such as, for example, wire connection 614, or wirelessly in accordance with an embodiment of the present invention.

The stylus position-signaling adaptor 611 may comprise sample time data elements, wherein the sample time data elements may be associated with transmission times of signal pulses. The stylus subsystem unit 601 may also comprise a signal-conditioning module 612 adapted to drive the transducer 604 of the stylus. The stylus subsystem unit 601 may also be adapted for ultrasonic communication with the reader subsystem unit device 602 via an ambient medium 605 (air) through which the signal pulses are transmitted.

In an embodiment according to the present invention, the main system unit 603 may comprise a computer processing unit (CPU) module 632 and a data transmission bus 633. The data transmission bus 633 may directly connect the stylus subsystem unit 601, via connector 631, and the reader subsystem unit 602, via connector 623, to the CPU module 632.

From the reader subsystem unit 602, microphone connections (may be via wires or wireless) 626 may be adapted to couple the microphones 606 to the reader subsystem unit 602.

The reader subsystem unit 602 may comprise an internally configured adaptor module 620. The adaptor module 620 may comprise an acquisition data interface 6201, for acquiring data from the plurality of microphones 606, and a proximity data register 6202, for recording moment by moment position information of the transducer 604 with respect to each of the plurality of microphones 606.

The CPU module 632 (in the main system unit 603) may comprise a position register 6322 associated with the proximity data register 6202 (in the reader subsystem unit 602). The CPU module 632 (in the main system unit 603) may also comprise a sample time register 6321 associated with the transmission time register 611 (in the stylus subsystem unit 601).

Aspects of the present invention may be found in a method for using spatial chirography system. The method may comprise emitting a pulse, associating an emission time with a sample departure time, and acquiring/determining a sample stylus transducer position, for example. A sample arrival time at the reader microphones may be observed and stored in a reader-adaptor register, for example.

Because the speed of sound in the ambient medium (air) is relatively constant, differences in sample arrival times among the plurality of microphones is attributable to relative proximity of the sound emitter (the transducer) and the sound receivers (microphones). The speed of sound in air is said to be "relatively constant" because the speed of sound in air is temperature-dependent. At room temperature, for example, (i.e., 70 degrees Fahrenheit), the speed of sound in air is 344.021 meters per second (m/s) which is equal to 1128.68 feet per second (ft/s)).

Exemplary travel distances of signal pulses, according to an embodiment of the present invention, may be on the order of a few centimeters/inches, for example, wherein the air in the region of interest near/around the typeface frame would have an identical temperature throughout the region, resulting in very precise time measurements and position determinations.

A position-locating (triangulation) procedure may comprise three microphones, hence triangulation. The microphones may be placed in non-collinear positions about the reader typeface frame. The positions of the microphones may be randomly determined or predetermined in advance.

Figure 7:
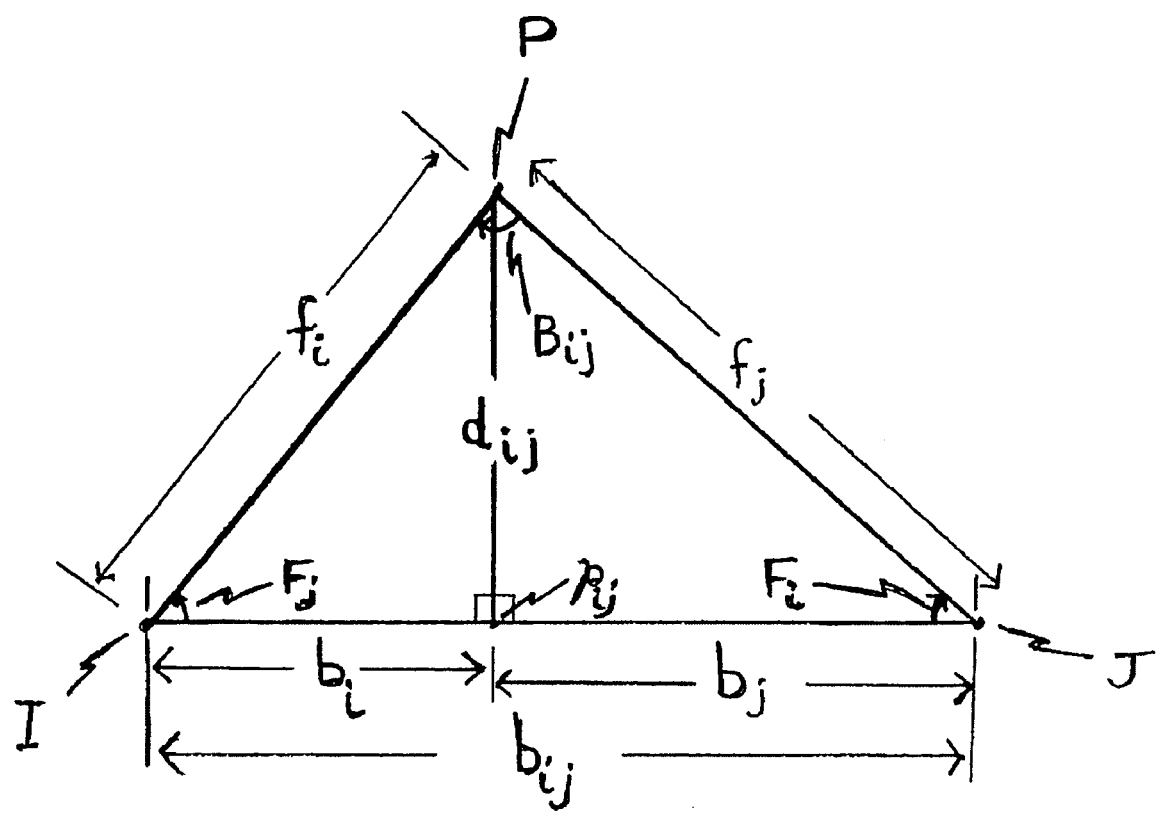
FIG. 7 is a perspective illustration of a method of determining a distance of a point P from a baseline formed by any two sensors located at reference points I and J according to an embodiment of the present invention.

FIG. 7 is a perspective illustration of a method of determining a distance of a point P from a baseline formed by any two sensors located at two reference points I, J according to an embodiment of the present invention.

For any two microphones located at any two reference points, for example, points I and J illustrated in FIG. 7, the spatial distance separating the points I and J may be a position-locating baseline IJ of length $b_{ij}$. The remote signal emitter may be located at a point P and may be determined by the signal flight/travel distances, $f_i$ and $f_j$, from point P to sensors at points I, J, respectively. The position-locating procedure may require consideration of a triangle formed by the points I, J, and P, wherein the sides PI, PJ, and IJ, respectively, of triangle IJP have lengths $f_i$, $f_j$, and $b_{ij}$, respectively, and each side may have an opposing angle $F_i$, $F_j$, and $B_{ij}$ in the triangle, respectively. The position-locating procedure may employ a basic planar trigonometric identity such as, for example, the law of cosines:

$$b_{ij}^2 = f_i^2 + f_j^2 - 2f_i f_j \cos B_{ij},$$

from which the area of the triangle $A_{ij}$ may relate to the length of the triangle's sides by the following formula:

$$A_{ij}^2 = s_{ij}(s_{ij}-f_i)(s_{ij}-f_j)(s_{ij}-b_{ij})/4,$$

where $s_{ij}$ is half the perimeter of the triangle:

$$s_{ij} = (f_i + f_j + b_{ij})/2.$$

Furthermore, if $p_{ij}$ is a point on baseline IJ at distance $d_{ij}$ nearest to P, then point P is at distance $d_{ij}$ from the baseline, and the point $p_{ij}$ partitions the length $b_{ij}$ of the baseline into two sections $Ip_{ij}$ of length $b_i$, and $p_{ij}J$ of length $b_j$, where:

$$b_{ij} = b_i + b_j.$$

Because $Pp_{ij}$ is perpendicular to the baseline IJ, the area of triangle IPJ may also be expressed as half the rectangle spanned by the baseline IJ and the distance from P:

$$A_{ij} = d_{ij} b_{ij}/2.$$

The area formula for $A_{ij}$ permits determining the distance of P from baseline IJ by the formula:

$$d_{ij}^2 = 4s_{ij}(s_{ij}-f_i)(s_{ij}-f_j)(s_{ij}-b_{ij})/b_{ij}^2,$$

and by Pythagoras' Theorem, the partitions of the baseline are given by the formulae:

$$b_i^2 = f_i^2 - d_{ij}^2, \text{ and}$$

$$b_j^2 = f_j^2 - d_{ij}^2.$$

FIG. 8 is a perspective illustration of a position-location method using a redundant coplanar fourth sensor on a typeface plane to determine X, Y, and Z coordinates of a remote point P according to an embodiment of the present invention. The triangulation procedure using two microphones may therefore determine one linear coordinate ($b_i$ or $b_j$) along the baseline IJ as illustrated in FIG. 7.

However, to locate the position of a point P in a plane, or two dimensionally, for example, the procedure may comprise at least three microphones at three non-collinear points I, J, and K, (hence triangulation) to extract a second independent coordinate $b_k$ orthogonal to $b_i$ and $b_j$, for example. Likewise, to extract a third independent coordinate, or three dimensionally, for example, the procedure may comprise four microphones at four non co-planar points I, J, K, and L to extract the third independent coordinate $b_l$ orthogonal to $b_i$, $b_j$, and $b_k$.

A third microphone may be placed in non-collinear position in the reader typeface plane to capture the X-Y coordinate of the signal emitter. A fourth microphone may be placed in a non-coplanar position about the reader typeface frame to capture the Z-coordinate perpendicular to the typeface plane. The positions of the microphones may be randomly determined or may be determined in advance. A redundant coplanar fourth microphone in an embodiment of the present invention may also be used in a rectangular arrangement of microphones, as illustrated in FIG. 8, to obtain more X-Y readings from which a Z-axis coordinate may be derived by applying the Pythagoras Theorem on two vertically coplanar distances $d_{ij}$, and $d_{kl}$, for example, obtained as described above, where the Z-coordinate is the vertical height $h_{jkli}$ of point P from the baseplane IJKL, and is given by:

$$h_{jkli}^2 = 4s_{jkli}(s_{jkli}-d_{kl})(s_{jkli}-d_{ij})(s_{jkli}-b_{jkli})/b_{jkli}^2,$$

where $b_{jkli}$ is the distance between the opposite baselines JK and LI of average separation distance:

$$b_{jkli} = (b_{jk} + b_{li})/2,$$

and $s_{jkli}$ is the half-perimeter of the triangle $p_{kl}Pp_{ij}$ having length:

$$s_{jkli} = (d_{ij} + d_{kl} + b_{jkli})/2.$$

Each of the segments of baselines IJ, JK, KL, and LI marked by the partition points $p_{ij}$, $p_{jk}$, $p_{kl}$, and $p_{li}$, illustrated in FIG. 8, provide estimates of the X and Y coordinates, and the vertical segment $h_{jkli}$ provides an estimate of the Z coordinate of the stylus tip position P.

In an embodiment according to the present invention, as illustrated in FIGS. 5 and 8, four microphones may be used, wherein each microphone may be disposed on a corner of the reader frame, for example.

In FIG. 5, the microphones 506 are illustrated protruding from a top portion of the reader frame 521 for visual effect. In an embodiment according to the present invention, the microphones may be mounted in recessed positions for safety of operation and to shield the microphones from damage, for example.

In an embodiment according to the present invention, as illustrated in FIGS. 5 and 8, for example, four overlapping triangles may be available to triangulate a transducer position, such as, for example, ILK, ILJ, LKJ, IKJ, LPI, LPK, IPJ, KPJ, etc. as illustrated in FIG. 8. For a particular ultrasonic pulse frequency, a pulse detection position resolution limit may exist in the transmission medium. It may therefore be appropriate to acquire multiple readings at each position to obtain a best statistical estimate at each discernible location of the transducer. If the placement of the first three microphones is such that the triangulation localizes the transducer within the typeface plane, then a fourth microphone may be placed in a non-coplanar position relative to the first three, to enable sensing of spatial depth relative to the typeface plane, i.e., a three-dimensional spatial position. Although four microphones have been described, the invention is not limited to four microphones.

When the stylus emits analog pulses, the pulse departure time may be correlated within the main system so that pulses arriving at the respective microphone locations may be assigned sample departure times upon arrival. The system may be adapted to modulate each pulse digitally and to encode the respective departure time into the pulse's waveform. The stylus-signaling unit may encode the sample departure time into the positioning pulse. The reader adaptor may be adapted to decode the time from the received pulse upon the pulse arriving at the reader or at the chirographic processing system. If modulation is not performed upon emission, then a system-wide pulse departure time may be tracked for association with each arriving pulse, for example.

Chirographic reader applications may also comprise recording an angle of orientation of the stylus. The angle may be between the top of frame and the attitude of the stylus along an upward direction of handwriting sample. The angle may be zero if the frame is aligned to the same orientation as the handwriting sample and may be non-zero when there is a tilt between the handwriting sample and the horizontal direction of the frame. The orientation may be measured as an angle of departure from the Z-axis, the Y-axis, the X-axis, or combination thereof.

A similar angle of orientation may be found in performing a calligraphic rendering wherein a nib of a calligraphic pen may be fixed at some random or determined orientation. The stylus may or may not have a mechanical coupling. Depending upon a transducer horn design, the stylus may be directionally sensitive, wherein the signal strength may be attenuated significantly away from a particular pointed-to direction. The sensor array may be programmed to derive a stylus tilt angle from a relative strength of a received pulse after attenuation due to distance/position is accounted for.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment(s) disclosed, but that the invention will include all embodiments falling within the scope of the appended claims.

What is claimed is:

1. A spatial chirographic system, the system comprising:
   a signal pulse-emitting source subsystem unit;
   a reader subsystem unit; and
   a main system unit, wherein the signal pulse-emitting source subsystem unit, the reader subsystem unit, and the main system unit are adapted to cooperatively interpret handwriting character information
   wherein the signal pulse-emitting source subsystem unit comprises a signal pulse-emitting source comprising a signal-emitting device, the signal-emitting device being located in a tip of the signal pulse-emitting source and the signal pulse-emitting unit, the reader subsystem unit and the main system unit cooperate to determine a position of at least the tip of the signal pulse-emitting source in a reference chirographic font-centric coordinate frame.

2. The system according to claim 1, wherein the signal-emitting device comprises a remote signal generator, the remote signal generator comprising one of a transducer, a radio frequency generator, and optical generator, and infrared generator, and an ultrasonic generator, and remote signals emitted by the remote signal generator comprise one of a radio frequency signal, an optical signal, and infrared signal, and an ultrasonic signal.

3. The system according to claim 1, wherein the signal pulse-emitting source subsystem unit comprises:
   an electrical interface between the signal pulse-emitting source and a system data bus;
   signal time memory locations; and
   a signal-conditioning module.

4. The system according to claim 1, wherein the signal pulse-emitting source comprises:
   an elongated handle portion; and
   an electrical coupling affixed to a distal portion.

5. The system according to claim 1, wherein the reader subsystem unit comprises a plurality of sensing devices, the plurality of sensing devices are adapted to receive remote signals emitted by a remote signal-emitting device, wherein the remote signals received by the sensing devices are evaluated to determine a position of the remote signal-emitting device.

6. The system according to claim 5, wherein the plurality of sensing devices comprise one of a plurality of ultrasonic microphones, a plurality of radio frequency receivers, a plurality of optical sensors, and a plurality of infrared sensors, the remote signals comprising one of ultrasonic sound signals, radio frequency signals, optical signals, and infrared signals, the remote signals comprising a plurality of information encoded in the signals, and the remote signals travel at a determinable characteristic speed and vary by a determinable Doppler effect to continuous changes in a travel distance.

7. The system according to claim 5, wherein the reader subsystem unit comprises:
   a plurality of spatial proximity data memory locations; and
   a plurality of signal arrival time memory locations.

8. The system according to claim 1, wherein the reader subsystem unit comprises:
   a reader typeface frame;
   a plurality of sensors associated with the reader typeface frame;
   an electrical coupling adaptor for coupling sensor wires to the main system unit; and
   an electrical interface from the electrical coupling adaptor to a data bus in the main system unit.

9. The system according to claim 1, wherein the main system unit comprises a controller and a plurality of memory locations for storing information.

10. The system according to claim 9, wherein the controller comprises at least one processor and information stored in the plurality of memory locations comprises at least one of time information and position information associated with a signal-emitting device.

11. A method for spatially reading handwriting symbols, the method comprising:
    determining a position of a handwriting implement in a reference chirographic font-centric coordinate frame by:
      receiving a remote signal emitted by the handwriting implement at a plurality of locations;
      evaluating remote signal information corresponding to signal reception at each of the plurality of locations;
      receiving a plurality of additional remote signals emitted by the handwriting implement at the plurality of locations; and
      evaluating remote signal information corresponding to a plurality of signal receptions at each of the plurality of locations for the plurality of additional remote signals; and
      determining a plurality of additional positions of the handwriting implement in a reference chirographic font-centric coordinate frame over a period of time; and
    determining a handwriting symbol corresponding to the plurality of positions that the handwriting implement has within the period of time.

12. The method according to claim 11, further comprising:
    associating a plurality of sensors with a reader interface device;
    maintaining a time counter;
    conditioning a position signal pulse; and
    modulating a sample time into the signal pulse.

13. The method according to claim 11, further comprising:
    emitting a position signal pulse from a signal emitter associated with a signal pulse-emitting source;
    recording an pulse emission time; and
    recording a pulse departure time.

14. The method according to claim 11, further comprising:
    detecting a received position signal pulse at a plurality of reader sensors;
    recording arrival times of signal pulses at each of the plurality of reader sensors; and
    demodulating a sample departure time from the signal pulse.

15. The method according to claim 11, further comprising:
    deriving a pulse transmission time for a plurality of signal pulse arrival times; and
    locating a spatial position of a signal pulse-emitting source by at least one triangulation calculation.

16. The method according to claim 11, further comprising deriving an instantaneous position of a signal pulse-emitting source based upon known positions of a plurality of sensors.

17. The method according to claim 11, further comprising storing signal pulse-emitting source position information in interface memory locations for acquisition by system main, wherein the signal pulse-emitting source position information is based upon a relationship between a signal pulse-emitting source instantaneous position and a plurality of known positions of a plurality of sensors.

18. The method according to claim 11, further comprising averaging a plurality of positions calculated by at least one triangulation technique using known positions of a plurality of sensors.

19. The method according to claim 11, further comprising determining an orientation of a signal pulse-emitting source based upon known positions of a plurality of sensors.

20. The method according to claim 19, wherein determining the orientation of the signal pulse-emitting source comprises affixing an elongated hood to the signal pulse-emitting source, the elongated hood focusing and directing emitted signals along a signal pulse-emitting source axis line and attenuating emitted signals in other directions.

21. A method for spatially reading handwriting symbols, the method comprising:

determining a position of a handwriting implement by:

receiving a remote signal emitted by the handwriting implement at a plurality of locations;

evaluating remote signal information corresponding to signal reception at each of the plurality of locations;

determining a plurality of additional positions of the handwriting implement over a period of time by;

receiving a plurality of additional remote signals emitted by the handwriting implement at the plurality of locations; and evaluating remote signal information corresponding to a plurality of signal receptions at each of the plurality of locations for the plurality of additional remote signals;

determining a handwriting symbol corresponding to the plurality of positions of the handwriting implement;

determining an orientation of a signal pulse-emitting source based upon known positions of a plurality of sensors wherein determining the orientation of the signal pulse-emitting source comprises affixing an elongated hood to the signal pulse-emitting source, the elongated hood focusing and directing emitted signals along a signal pulse-emitting source axis line and attenuating emitted signals in other directions; and recording a signal strength of a received signal by each of a plurality of sensors.

22. The method according to claim 21, wherein determining the orientation of the signal pulse-emitting source further comprises accounting for attenuation of signal strength arising from distance and ascribing the orientation of the signal pulse-emitting source to an attenuation component that is attributable to factors other than distance.

\* \* \* \* \*

UNITED STATES PATENT AND TRADEMARK OFFICE
CERTIFICATE OF CORRECTION

PATENT NO. : 7,668,375 B2  Page 1 of 1
APPLICATION NO. : 10/876314
DATED : February 23, 2010
INVENTOR(S) : Malome T. Khomo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1458 days.

Signed and Sealed this

Twenty-eighth Day of December, 2010

David J. Kappos
*Director of the United States Patent and Trademark Office*